C. A. CASE.
DESULFURIZING APPARATUS FOR REFRACTORY ORES.
APPLICATION FILED OCT. 11, 1909.
982,243. Patented Jan. 24, 1911.
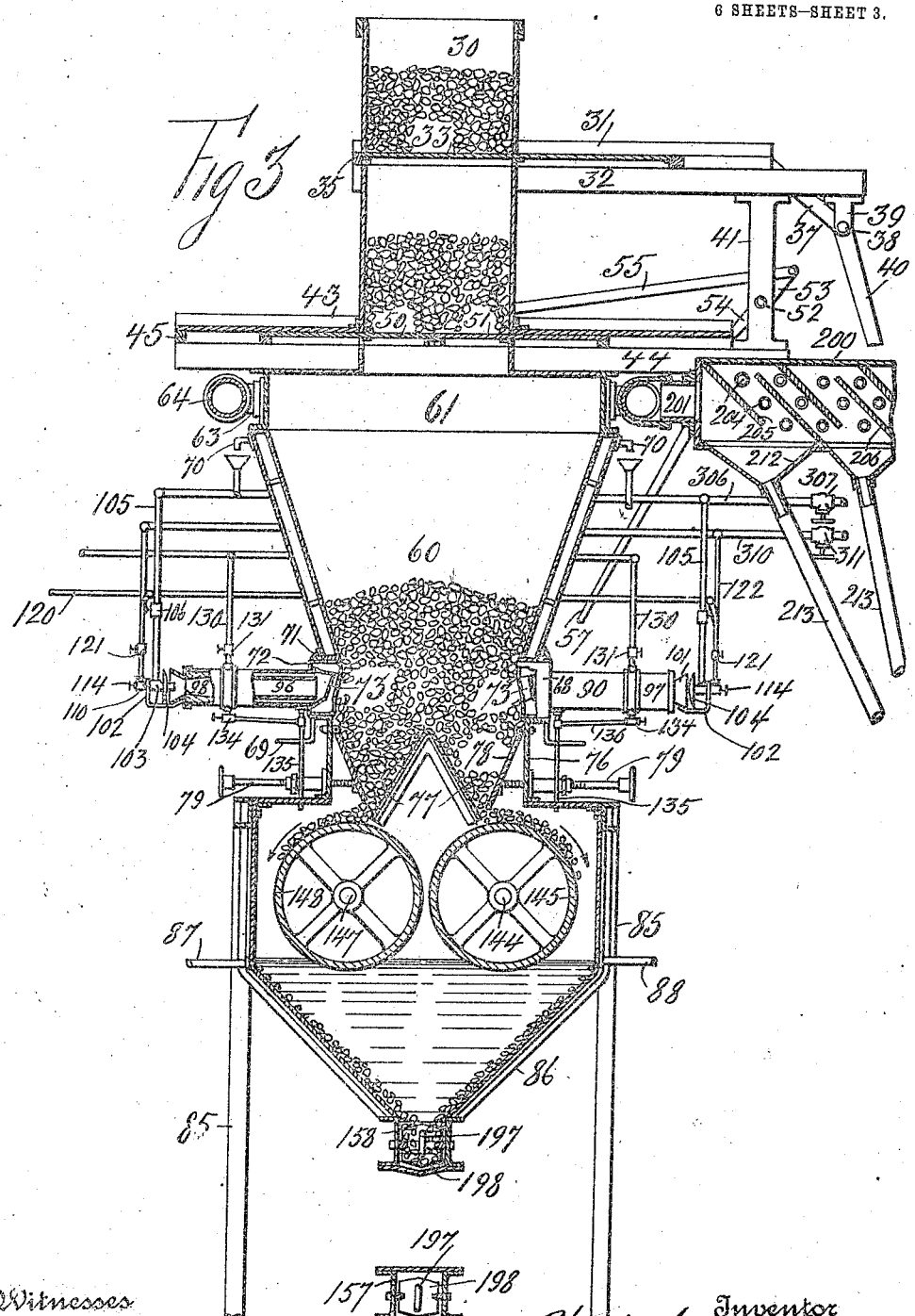

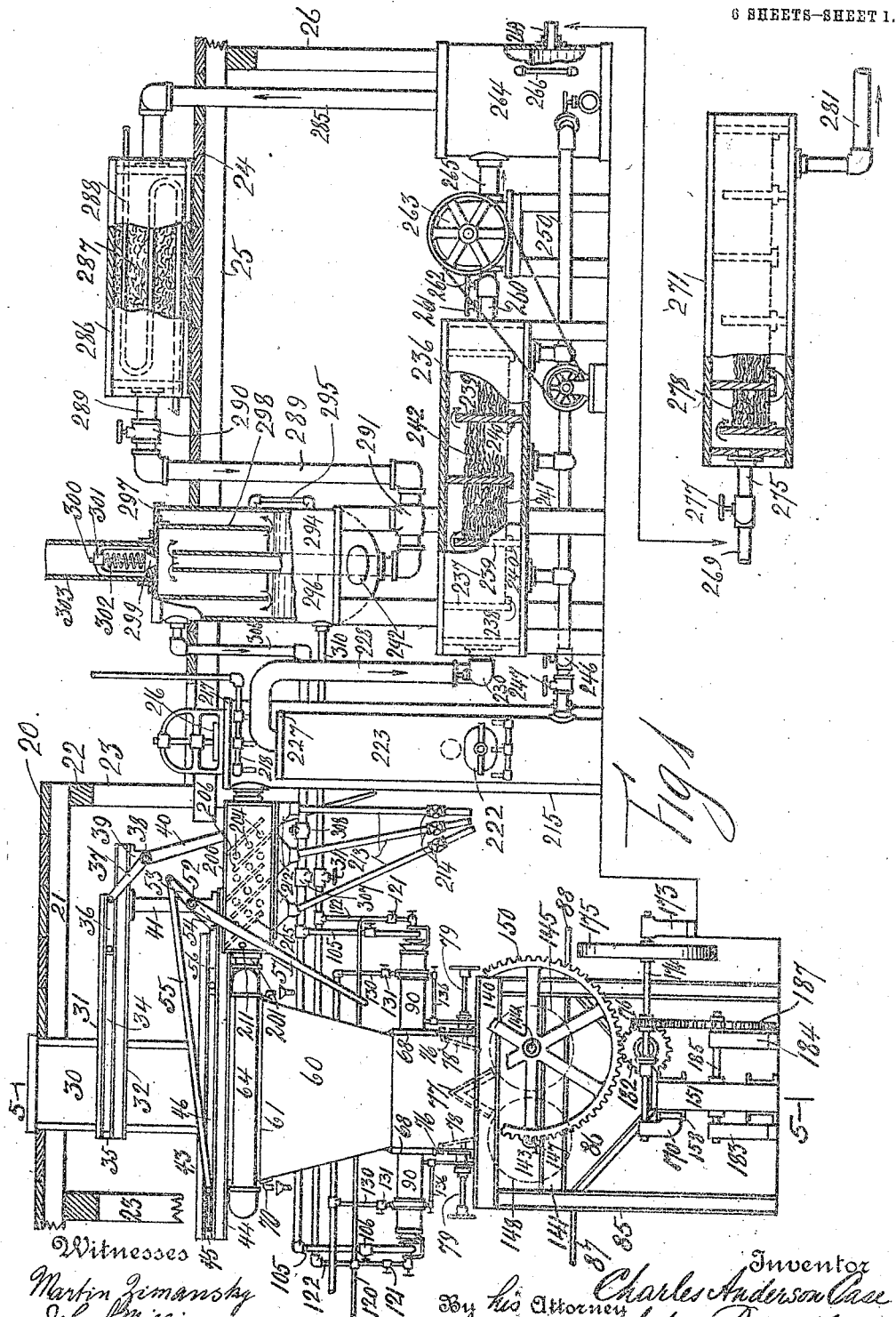

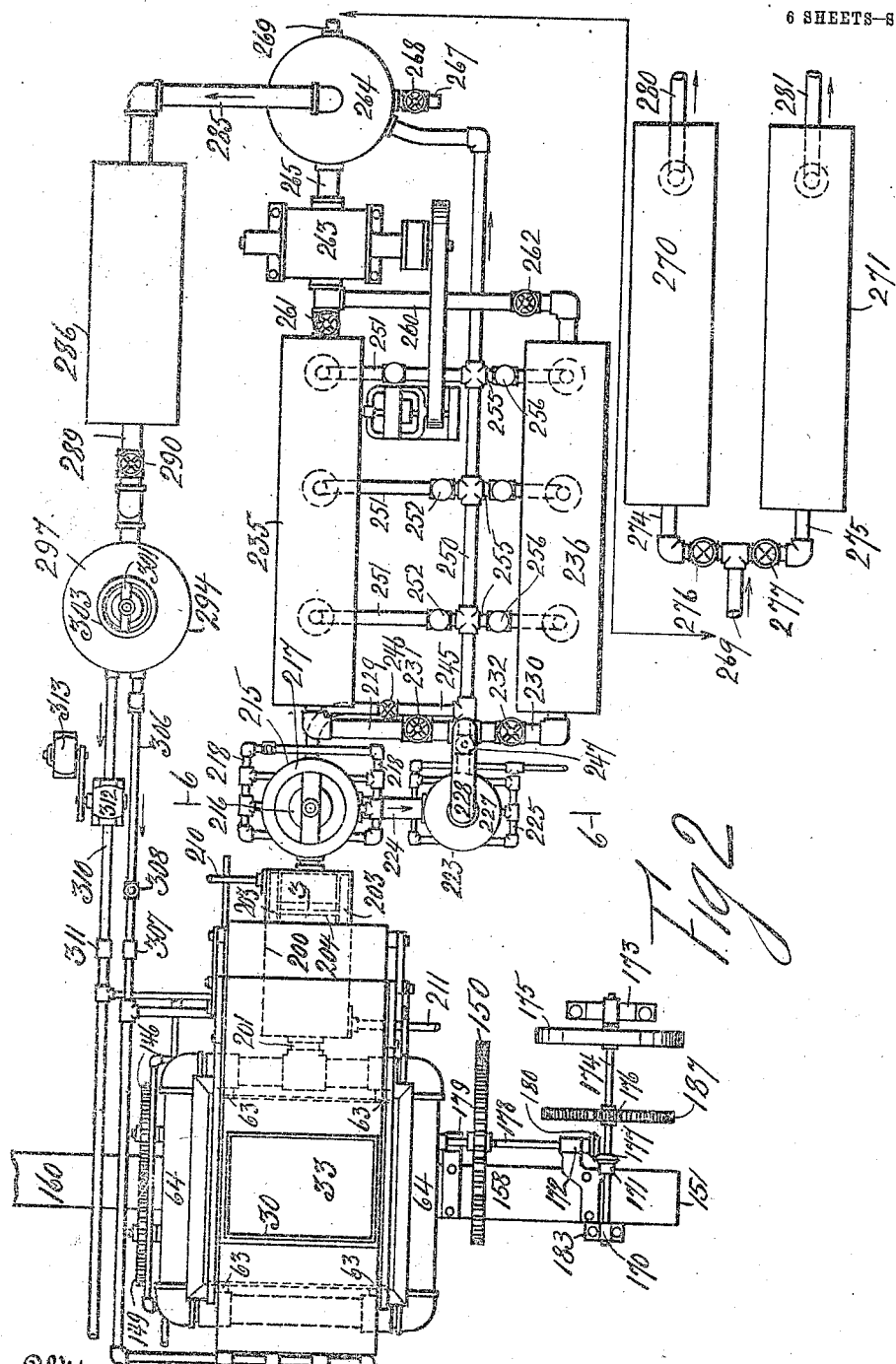

C. A. CASE.
DESULFURIZING APPARATUS FOR REFRACTORY ORES.
APPLICATION FILED OCT. 11, 1909.
982,243.
Patented Jan. 24, 1911.
6 SHEETS—SHEET 4.
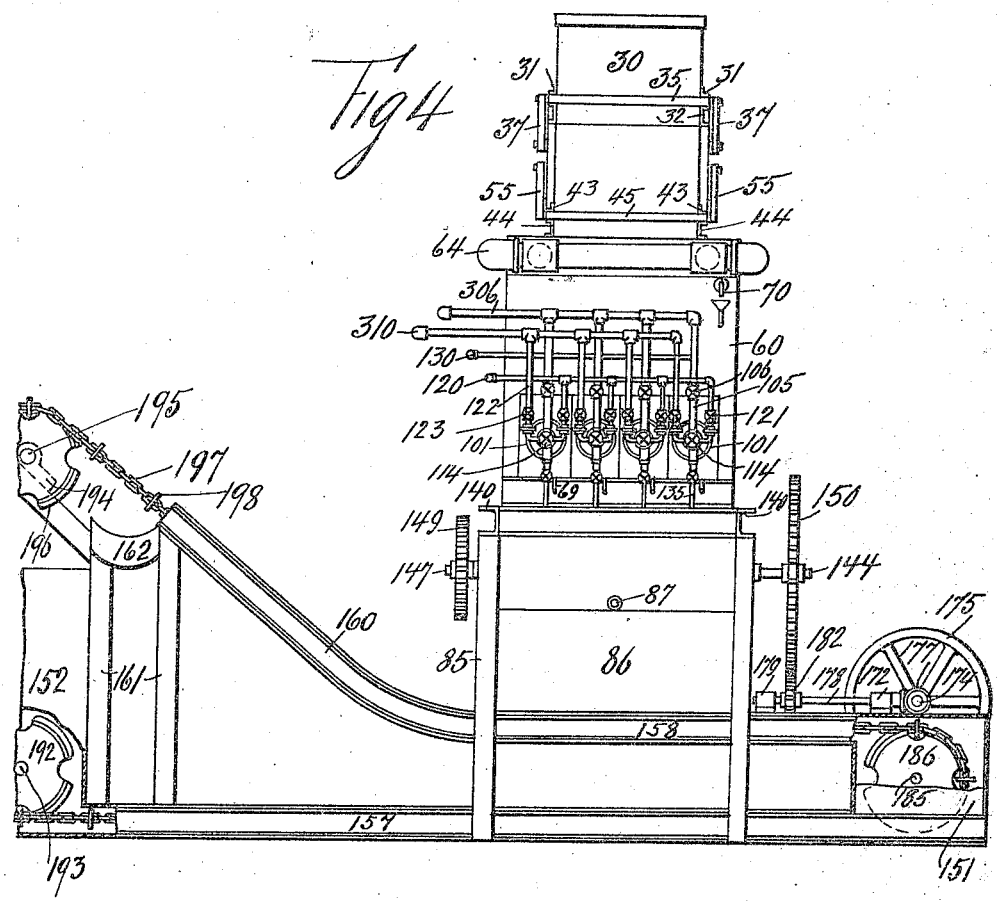

C. A. CASE.
DESULFURIZING APPARATUS FOR REFRACTORY ORES.
APPLICATION FILED OCT. 11, 1909.
982,243.
Patented Jan. 24, 1911.
6 SHEETS—SHEET 5.
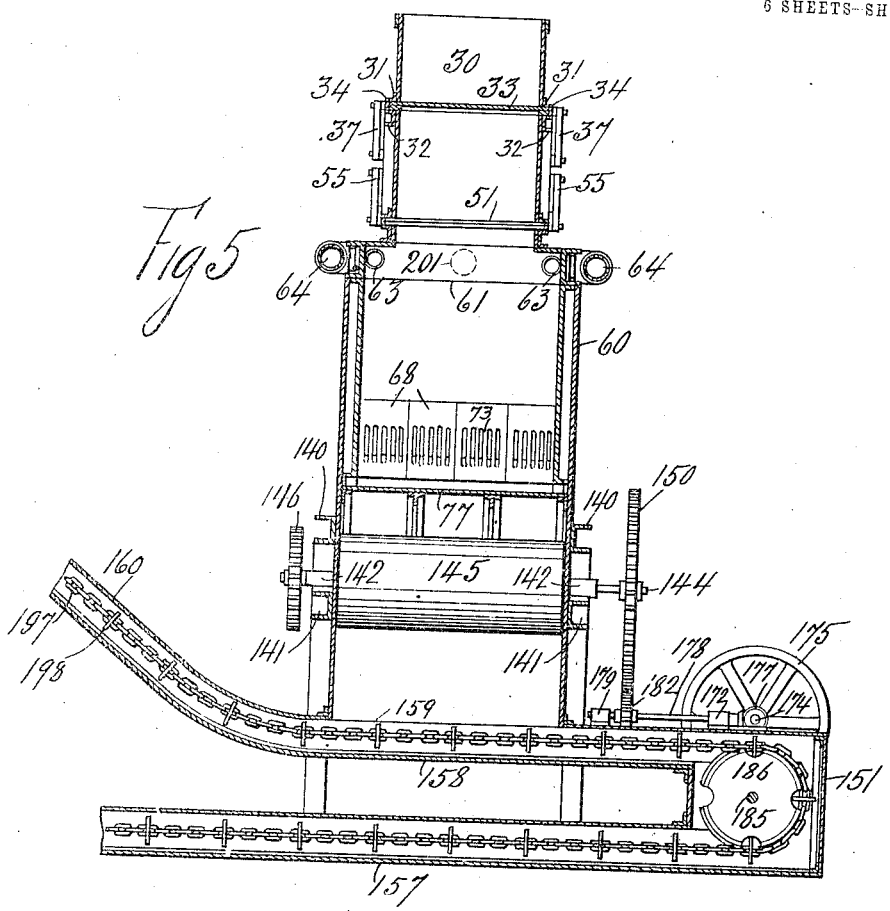

C. A. CASE.
DESULFURIZING APPARATUS FOR REFRACTORY ORES.
APPLICATION FILED OCT. 11, 1909.
982,243.
Patented Jan. 24, 1911.
6 SHEETS—SHEET 6.
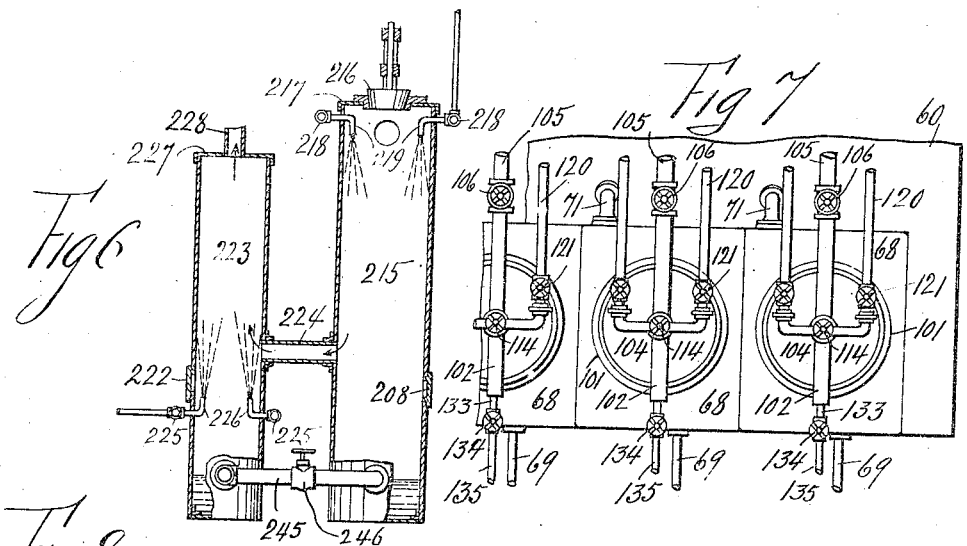
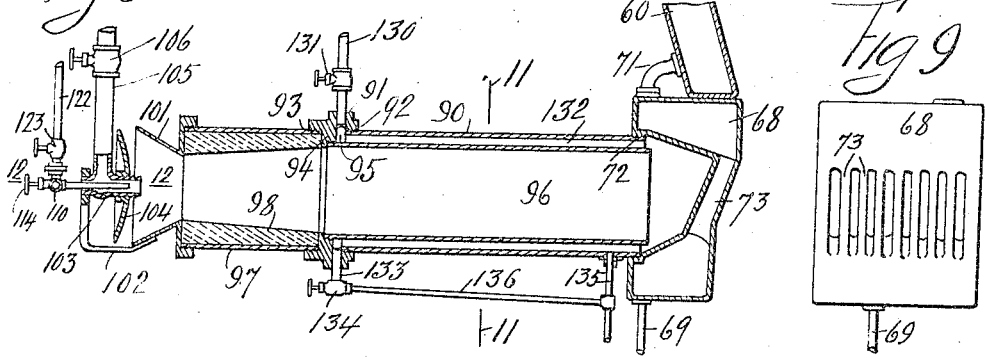
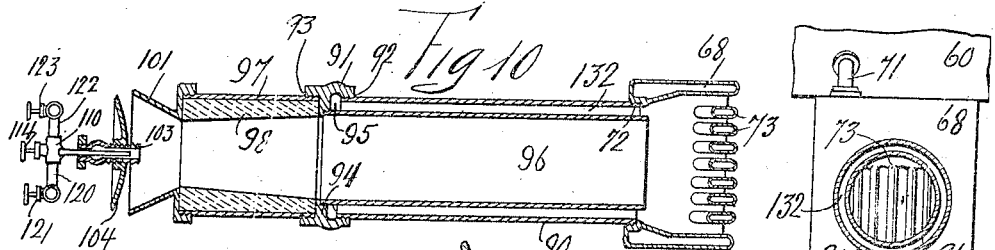
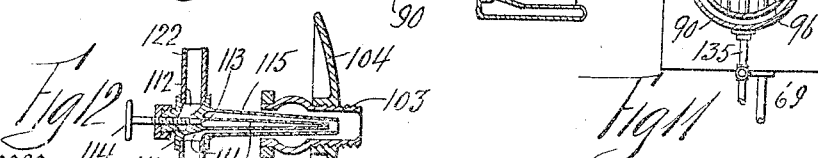
Inventor
Charles Anderson Case

UNITED STATES PATENT OFFICE.

CHARLES ANDERSON CASE, OF NEW YORK, N. Y., ASSIGNOR, BY MESNE ASSIGNMENTS, TO ORE DESULPHURIZATION COMPANY, A CORPORATION OF NEW YORK.

DESULFURIZING APPARATUS FOR REFRACTORY ORES.

982,243.

Specification of Letters Patent. Patented Jan. 24, 1911.

Application filed October 11, 1909. Serial No. 521,972.

*To all whom it may concern:*

Be it known that I, CHARLES ANDERSON CASE, a citizen of the United States, and a resident of the borough of Manhattan, in the county of New York and State of New York, have invented certain new and useful Improvements in Desulfurizing Apparatus for Refractory Ores, of which the following is a specification.

This invention relates to a desulfurizing apparatus for refractory ores. Its object is to treat refractory ores with superheated steam and air for the purpose of bringing about a rapid desulfurization of said ores. To imbrittle ore by sudden quenching directly after it is roasted, and to recover the metals from fumes generated in the furnace of the apparatus.

A further object is to provide appurtenances for the continuous discharge of the gangue and reduced metals, and the return to the furnace of any unconsumed gases that have passed through the apparatus to aid the desulfurization of said ores.

In the accompanying drawings which exemplify the invention, Figure 1 shows an elevation of the invention, Fig. 2 represents a plan view of Fig. 1, Fig. 3 is an enlarged section of a portion of Fig. 2 on the line 3, 3, Fig. 4 shows a partial left hand side view of Fig. 1, Fig. 5 represents a partial section of Fig. 1 on the line 5, 5, Fig. 6 is a section of Fig. 2 on the line 6, 6, Fig. 7 shows an enlarged portion of Fig. 4. Fig. 8 represents an enlarged axial vertical section of one of the twyers with its support, Fig. 9 is a partial right hand end view of Fig. 8, Fig. 10 shows an horizontal axial section of a twyers with its support, Fig. 11 is a section of Fig. 8 on the line 11, 11 and Fig. 12 is a partial enlarged section of Fig. 8 on the line 12, 12.

The principal elements of the invention will be first described, after which the said elements and their functions will be considered in detail.

The twyers described herein as well as the steps of the process to desulfurize the ores and treat the fumes generated are claimed in separate accompanying applications, namely an application for a twyer filed Oct. 11th, 1909, Serial No. 521,973, and an application for a process for reducing and desulfurizing refractory ores, filed Oct. 11th, 1909, Serial No. 521,974.

A structure is shown with a charging platform 20 supported on the girders 21, 22, carried on columns 23, and the upper operating platform 24 supported on the girder 25 carried on columns 26.

A charging hopper is represented at 30, the upper end or mouth of which is just above the platform 20, and in about the central portion thereof are located upper guides 31 and lower guides 32, which support the upper sliding gate 33. The latter is protected on the sides by guides 34 and on one end by the stop 35. The sliding gate 33 has pinned thereto links 36 that are in turn pinned to levers 37 extending from the shaft 38. The said shaft is fulcrumed in brackets 39 extending from the lower guides 32, and has attached thereto the first operating lever 40. The guides 32 are supported at one end upon columns 41. A second pair of upper and lower guides 43, 44 respectively and stop 45 with side guides 46, are also connected with the hopper 30, and the upper end of the furnace to be described. A pair of lower sliding gates 50 and 51 are located between the guides 43 and 44. A shaft 52 is fulcrumed in the columns 41 and has fastened thereto pairs of arms 53, 54. The end of the arms 53 are pinned to links 55 that are in turn pinned to the sliding gate 50. Links 56 are connected to the arms 54 and the sliding gate 51. A second operating lever 57 is fastened to the shaft 52. The office of the sliding gates 33, 50 and 51, is to charge the furnace with ore to be treated, by first opening and closing the upper sliding gates 33 and then opening and closing the lower sliding gates 50 and 51 by means of the levers 40 and 57. The central opening between the ends of the sliding gates 50 and 51 deposits the charge of ore into the central portion of the water jacketed inclosed furnace 60. The charging hopper 30 connects with the inclosed head 61 of the furnace and said head has formed therewith openings for the nipples 63, that connect with the fume piping 64 that surrounds said head 61.

The furnace has fitted thereto the water jacketed twyer supports 68. Water piping 69 leads into the latter and water outlet piping 70 extends from the furnace 60, while pipe connections 71 connect the water jackets of said supports with the water jackets of the furnace. Each water jacketed twyer support 68 has a circular threaded opening 72 at one side, and water conduits 73 connect the upper and lower portions of the opposite sides thereof. The said conduits constitute water jacketed protecting bars for the said twyer supports.

The lower end of the furnace is supported on a frame 76 which has connected up therewith the inclined stationary separating and discharging chutes 77. and the adjustable chutes 78, which latter are inclined to different positions by means of the screw rods 79. Framing 85 supports the frame 76 and also the cooling hopper 86 having the inlet piping 87 and outlet piping 88. The chutes 77 and 78 lead charges of gangue and metal to the said cooling hopper 86.

In each threaded opening 72 of the twyer supports 68 is secured the outer barrel 90 of the twyer which at its outer end carries the ring 91. The latter has formed therewith the threaded ends 92, 93 of the same internal diameter and an inwardly extending flange 94. An inner annular port 95 is formed with said ring. The engagement of the barrel 90 and ring 91 is made secure by the engagement of the threaded end 92 with a corresponding thread on the said barrel 90. A combustion chamber 96 within the barrel 90 has one end supported on the flange 94. An igniting barrel 97 with the tapering sleeve 98 of fireclay and the like is supported in the threaded end 93 of the ring 91. A funnel cap 101 is connected to the outer end of the sleeve and has extending from the lower portion thereof the bracket 102. The latter supports a fuel chamber 103 threaded on its outlet for the adjustable damper 104, that can be located in different portions of the outer surface of said fuel chamber 103, to control the volume of air drawn into the the outer surface of said fuel chamber 103 with the valve 106 is connected to the fuel chamber 103. A burner 110 with the chambers 111 and 112, has connected thereto the needle valve 113 having the handle 114. An outer nozzle 115 extends from the chamber 111, and a concentric inner nozzle 116 extends from the chamber 112. The said nozzles both extend into the fuel chamber 103. Steam piping 120 with the valve 121 connects with the said chamber 111, and oil piping 122 having the valve 123 connects with the chamber 112.

Steam piping 130 with the valve 131 is connected with the upper portion of the ring 91 of the barrel 90 to lead steam to the annular port 95 and from thence to the annular superheating chamber 132. Drain piping 133 with the valve 134 is connected with the lower end of said port 95. Drain piping 135 extends from the lower end of the barrel 90 and is connected with the valve 134 by means of the piping 136.

With the framing 85 are fitted pairs of horizontal top girders 140 and intermediate horizontal girders 141. The girders 141 carry journal brackets 142 and 143. A drum shaft 144 carrying the discharging drum 145 and spur gear 146, is journaled in the brackets 142. A drum shaft 147 carrying the discharging drum 148 located in the hopper 86, is journaled in brackets 143. A spur gear 149 with the teeth thereof meshing with the spur gear 146 is fastened to one end of the shaft 147 and a spur gear 150 is secured to the other end of said shaft 144.

Conveyer boxes 151 and 152 on opposite sides of the framing 85 are connected by the lower horizontal inclosed runway 157. From the upper end of the conveyer box 151 extends the upper inclosed runway, with the horizontal portion 158 having the opening 159 and the inclined portion 160. The opening 159 connects the runway 158 with the hopper 86. The upper end of the said inclined portion 160 is supported on a frame with the columns 161 and which supports a discharging chute 162.

A journal bracket 170 extends from the horizontal portions 158 of the upper runway, and a journal bracket with the members 171 and 172 is secured to the top of the said horizontal portion 158. A journal bracket 173 is located in the same axial center line with the bracket 170 and the said member 171. A shaft 174 is journaled in the bracket 170, member 171 and the bracket 173. The said shaft carries the driving pulley 175, pinion 176 and bevel gear 177. A shaft 178 is journaled in the member 172 and in a journal bracket 179 connected to the horizontal portion 158 of the upper runway. The shaft 178 carries a bevel gear 180 the teeth of which mesh with the teeth of the bevel gear 177, and a pinion 182 on said shaft gears with the spur gear 150. A journal bracket 183 is located on one side of the conveyer box 151, and a journal bracket 184 is located on the opposite side thereof.

A driving shaft 185 extending through the conveyer box 151 is journaled in the brackets 183, 184 and carries within said box the driving sprocket chain wheel 186. A spur gear 187 on the shaft 185 gears with the pinion 176.

A sprocket chain wheel 192 is secured to a shaft 193, journaled in brackets not shown in the sides of the conveyer box 152. Framing extending from the columns 161 support journal brackets like 194 for the shaft 195, on which latter is supported the sprocket chain wheel 196. A conveyer comprising the conveyer chain 197 and plates 198 is engaged by the said sprocket chain wheels, and extends through the conveyer boxes 151 & 152 as well as through the runways 157 and 158.

A baffle box 200 is connected to the fume piping 64 by means of the nipple 201.

Water jackets 203 are formed with the sides of said box and are connected by the pipes 204. Inclined baffle plates 205 extend from the roof of said box to within a short distance of the bottom, and baffle plates 206 alternating with the plates 205 extend from the bottom of said box to within a short distance of the roof thereof. Inlet piping 219 is connected with one of the jackets of the said box 200, and outlet piping 211 extends from the other water jacket thereof. Hopper outlets 212 with the pipes 213 and valves 214 extend from the bottom of said baffle box.

A spray tank 215 having a hand hole with the hand plate 208, is connected at its upper portion with the baffle box 200. A safety valve 216 covers a port in the bonnet 217 of the tank 215, and spray piping 218 with the downwardly extending nozzles 219 is located in the top end of said tank. The safety valve will rise when the predetermined pressure of the fumes to be described is exceeded, and the spray from the nozzles 219 percolates through the fumes in said spray tank. A second spray tank 223 with a hand hold having the hand hole plate 222 is located adjacent to the tank 215 and connected thereto by the piping 224. Spray piping 225 has extending therefrom the nozzles 226 which point upwardly and enter the tank 223 below the level of the piping 224. From the bonnet 227 of the tank 223 extends the upper portion of the fume piping 228.

The fumes in their downward travel in the tank 215 are cooled, by the spray of water discharged from the nozzles 219 in said tank. The fumes leave the tank 215 and enter the tank 223 by way of the piping 224. The spray from the nozzles 226 in the latter tank cool the fumes in their upward travel. The fume piping 228 has connected thereto the horizontal branches 229, 230 which are fitted respectively with the valves 231 and 232. The branch 229 leads into the zinc box 235 and the branch 230 leads into the zinc box 236. Both of said boxes are of the same construction. preferably made of wood and can be used together or one at a time. Each of the zinc boxes contains the baffle plates 237 extending from the roof thereof to within a small distance from the bottom of the said boxes. Flanges 238 are formed with the bottom ends of said baffle plates 237. Baffle plates 239 extend upwardly from the bottom of each zinc box to within a short distance of the roof thereof, and are located between the other baffle plates in the box. Flanges 240 extend from the lower portions of the baffle plates 239 and are on the same level with the flanges 238. Wire screens 241 are supported on the flanges 238 and 240 and with the baffle plates constitute chambers for zinc shavings 242. The fumes when passing through the zinc boxes are acted upon by the said zinc shavings.

Drain piping 245 connects with both the spray tanks 215, 223 and has fitted therewith the valves 246 and 247. Piping 250 is connected with the piping 245 and has extending therefrom the branch pipes 251 each fitted with a check valve 252, that connect with the zinc box 235 at the bottom thereof. Branch pipes 255 having the check valves 256 extend from the pipe 250 and connect with the zinc box 236 at the bottom thereof. The valves 246 and 247 allow the water to be drained from either or both of the tanks 215 and 223, and the piping 250 with its branches allows the drainage of the water from the zinc boxes 235 and 236. Fume piping 260 with the valves 261 and 262 connect the said zinc boxes with the exhauster 263. The office of the valves 261 and 262 is to permit the withdrawal of fumes from either of the zinc boxes to the sump tank 264, which latter is connected with said exhauster by the pipe 265. The piping 250 also leads to the sump tank 264 on a level below the pipe 265, to lead the water from the zinc boxes and spray tanks. The water carried with the fumes that enter the sump tank, collects and mixes with the water introduced therein through the piping 250. A water glass 266 on the sump tank 264 indicates the level of the water therein. A drain pipe 267 with the valve 268 is connected with the lower portion of said sump tank. Water discharge piping 269 leads from the sump tank 264 on a level between the piping 265 and 250.

A pair of, preferably wooden, zinc shaving boxes 270 and 271, similar to the boxes 235 and 236 and having the zinc shavings 278 are connected by branch pipes 274, 275 having respectively the valves 276 and 277. The said branch pipes connect with the piping 269. Discharge piping 280 extends from the lower portion of the zinc box 270, and discharge piping 281 extends from the lower portion of the zinc box 271.

Fume piping 285 extends from the top of the sump tank 264, to lead the fumes to a box 286, preferably made of wood and filled with iron shavings 287. A steam coil 288 in the box 286 dries the fumes therein. Fume piping 289 with the stop valve 290 and check valve 291, leads from the box 286 and connects with the bottom of the oil tank 294 having the gage glass 295 and hand hole with the hand hole plate 292. A pipe 296 connected with the piping 289 extends into the said tank 294, to within a short distance of the upper end thereof. The tank has a bonnet 297 to which is fastened a barrel 298, that extends to about the middle portion of the tank and incloses a portion of the pipe 296.

In the bonnet 297 is formed a port for the safety valve 299, that has the spindle 300 which is guided in the frame 301. A spring 302 surrounds the spindle 300 and bears between said valve 299 and the upper end of the frame 301. A fume discharge pipe 303 extends from the bonnet 297 and surrounds the appurtenances of said valve 299.

From the upper portion of the tank 294 extends the fuel gas piping 306, with the stop valve 307 and check valve 308. The piping 306 connects with the fuel gas inlet piping 105 of the twyers having the outer barrels 90. Oil piping 310 with the stop valve 311 extends from the lower portion of the oil tank 294, and has connected thereto the pump 312 driven by the motor 313. The piping 310 connects with the oil piping 122 of each of the burners 110 of the twyers.

To operate the invention refractory sulfid ores are charged into the upper end of the charging hopper 30, and by means of the upper sliding gate 33 the charge is deposited on the lower sliding gates 50 and 51. The latter, by means of the operating lever 57, allow the charges of ore to descend into the central portion of the furnace 60, and pile up from the chutes 77 and 78 above the level of the twyers. Next the exhauster 263 is started. Then a piece of oily waste is placed within the tapering sleeve 98, and the operation of each twyer being the same, the operation of one only will be explained. The valve 123 of the oil piping 122 is opened as well as the valve 121 of the steam piping 120. The motor 313 rotating, oil is forced from the oil tank 294 through the piping 310, the valve 311 being open, and through the oil piping 122 of the twyer. The said oil flows through the inner nozzle 116 of the burner 110, its volume being controlled by the needle valve 113. The oil after leaving the inner nozzle passes through the tip end of the outer nozzle 115, and from thence through the fuel chamber 103, and finally into the tapering sleeve 98. As the oil leaves the inner nozzle 116 it mixes with and is vaporized by the steam which enters by way of the piping 120 and the outer nozzle 115. The vaporized oil and steam is ignited in said tapering sleeve 98 and then passes into the combustion chamber 96 on its way through the twyer support 68 to enter the furnace. While the charge of vaporized oil is burning in the combustion chamber 96, steam is admitted to the annular superheating chamber 132, by way of the piping 130, superheating the steam in said chamber. When the charge enters the twyer support 68 it meets and mixes with said super-heated steam. While the charge of steam and vaporized oil is entering each twyer air is drawn into the said twyers through the funnel caps 101 to support the combustion of the charge, the volumes of air being regulated by the dampers 104. The action of the superheated air on the sulfids of the ore is the desulfurization of the same. The endothermic reaction of the steam on the sulfids absorbs heat and thereby prevents the fusion of the ore. During the desulfurization, a part of the metals or metal, volatilize and pass as fume from the furnace, as the result of the low volatilization temperature of some of their compounds; the free metals and their compounds, which have a high volatilization temperature, remain in the furnace with the gangue of the ore.

The reactions which occur in the furnace with the superheated steam and oil when there is ample air supply for conducting roasting, may be represented as follows:

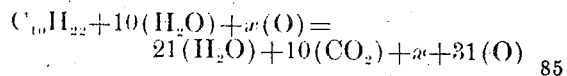
$$C_{10}H_{22} + 10(H_2O) + x(O) = 21(H_2O) + 10(CO_2) + x + 31(O)$$

If the steam supply is cut off, then the oil is consumed with the production of very high temperature according to the equation:

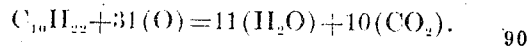
$$C_{10}H_{22} + 31(O) = 11(H_2O) + 10(CO_2).$$

The effect of the superheated steam is the prevention of very high temperature as the result of its endothermic reaction, that is the absorption of heat in order to bring about reaction. The superheated steam also reacts with the sulfids of the ore, removing sulfur according to the equation.

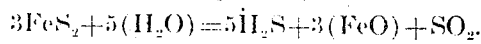
$$3FeS_2 + 5(H_2O) = 5H_2S + 3(FeO) + SO_2.$$

The above reaction occurs when no air is present; but when air is present, as in the case when roasting an ore in the furnace the reaction is

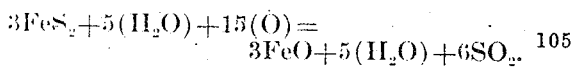
$$3FeS_2 + 5(H_2O) + 15(O) = 3FeO + 5(H_2O) + 6SO_2.$$

A general equation for the reactions on sulfid ores in the furnace when acted upon by the superheated steam and no air may be represented by the following, in which M designates metal

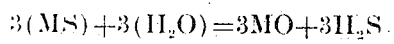
$$3(MS) + 3(H_2O) = 3MO + 3H_2S$$

and when both superheated steam and air act on the sulfid ores in the furnace, the following equation represents the reaction

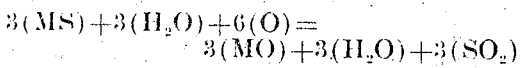
$$3(MS) + 3(H_2O) + 6(O) = 3(MO) + 3(H_2O) + 3(SO_2)$$

The metals which are carried off with the fumes are those which exist in the ore as minerals, which are volatile at the temperature at which the furnace is operated (between 600°–900°C). These minerals in the case of gold and silver are the tellurids and selenids especially. Some of the more commonly occurring of these are: white tellurium, petzite, sylvanite, nagyagite, and hessite, other minerals from which silver is volatilized at a comparatively low temperature are freieslebenite, polybasite, stephanite, pyrargyrite and proustite.

While the furnace is being charged with ores the discharging drums 145 and 148 are rotated in opposite directions to each other, by the rotations of the shaft 174 and the interposed gearing, the screw rods 79 regulating the openings between the chutes 77 and 78 to control the discharge from the furnace into the cooling hopper 86. When the heated ore drops into said cooling hopper it is disintegrated, and any free metal in the ore passes with in into the hopper and can be easily separated from the gangue. The said gangue with its free metal enters the opening 159 of the conveyer runway having the horizontal portion 158, and by means of the conveyer with the chain 197 and plates 198 is carried to the discharging chute 162 from which it is taken away.

The fumes are drawn up in the furnace 60 by virtue of the action of the exhauster 263, and the intervening pipe connections. After the twyers have started operations, by means of the steam piping 120 and the oil piping 122, and after a portion of the ore has been desulfurized, both may be shut off and the twyers operated by means of fuel gas generated in the oil tank 294, and also from combustible gases generated in the furnace after they have made a cycle of their operations and have returned to the furnace. While the furnace is in operation the discharging drums 145 and 148 are rotated at a speed to accurately discharge the gangue and free metal produced. After the fumes are have made a cycle of their operations and have returned to the furnace. While the furnace is in operation the discharging drums 145 and 148 are rotated at a speed to accurately discharge the gangue and free metal produced. After the fumes are drawn up the said furnace 60, they first enter the fume piping 64 and from thence into the baffle box 200, where the dust is separated therefrom by striking the baffle plates 205. The said dust enters the baffler outlets 212, escapes by way of the pipes 213, and contains the heavier particles of the metals which were volatilized in the furnace. The fumes are somewhat cooled in the said baffle box. The fumes next enter the spray tank 215 at the upper end thereof and are met therein by the sprays of water issuing from the nozzles 219. The water chills and separates a portion of the metals from the fumes which have escaped from the baffle box 200 and said separated metals drop to the bottom of the tank with the water. The fumes next enter the second spray tank 223, by way of the piping 224, where they are met by the spray of water issuing from the nozzles 226, when they are again cooled and a further separation of the volatilized metals therein takes place, which metals drop to the bottom of said second tank with the water therein. The metals in the tanks after the operations are finished are removed through the openings of the hand pole plates 208 and 222. In case excessive pressure is obtained in the spray tanks it is relieved by means of the safety valve 216. The fumes carry some $SO_2$ and $SO_3$ into the spray tank and wherein by their combination with water form $H_2SO_3$ and $H_2SO_4$. Some of the volatile minerals drawn into the spray tank are dissolved in the said $H_2SO_3$ and $H_2SO_4$. The fumes leave the spray tank 223 by way of the fume piping 228 and enter the zinc box 235 or 236, by keeping the valve 231 open and the valve 232 closed or vice versa. The zinc shavings 242 in the zinc boxes cause a further separation of the metals from the fumes and are deposited therein by filtration and by chemical precipitation.

The chemical precipitation of the metals in the zinc boxes can be represented by the following equations:

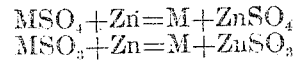

$$MSO_4 + Zn = M + ZnSO_4$$
$$MSO_3 + Zn = M + ZnSO_3$$

in which the symbol M designates metal in combination with the $SO_4$ and $SO_3$. After the completion of the process the zinc shavings with the said metals are removed and separated, after which fresh zinc shavings are placed in the zinc boxes. The water carried over with the fumes is discharged through the branch pipes 251 and 255, from which it enters the piping 250 and which latter is also connected with the spray tanks 215 and 223. The fumes next are drawn into the exhauster 263 and from thence discharged into the sump tank 264, the piping 250 leading the water into the lower portion of said sump tank. Water is separated from the fumes in the sump tank by gravitation and any metals mixed therewith are led with said water by means of the piping 268 into either one of the zinc boxes 270 or 271, in which zinc shavings 278 separate the metals from the water flowing therethrough.

The zinc shavings in the latter zinc boxes are removed after the process and the metals separated therefrom. The water is discharged from the zinc boxes 270 and 271 by means of the discharge piping 280 and 281.

The fumes are discharged from the sump tank through the fume piping 285, and enter the box 286 having the iron shavings 287. The reactions of the iron shavings on the fumes may be represented by the equations

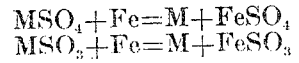

$$MSO_4 + Fe = M + FeSO_4$$
$$MSO_3 + Fe = M + FeSO_3$$

in which M designates the metals in combination with the $SO_4$ and $SO_3$. After the process the metals are easily separated from the $FeSO_4$ and $FeSO_3$. The fumes next enter the oil tank 294 by way of the piping 289 and pipe 296. As the fumes leave the pipe 296 they come in contact with the oil in said tank and vaporize some of said oil. The vaporized oil is used as fuel gas for the twyers. Metals carried with the fumes into the oil tank are filtered by the oil therein; and deposited on the bottom of said tank, from which they are removed through the opening having the hand hole plate 292. The fumes and fuel gas leave the oil tank 294 by way of the piping 306, after which they enter the fuel gas inlet piping 105. The latter leads them to the fuel chamber 103 and from which they enter the twyers. If sufficient fuel gas enters the piping 105, to superheat the steam entering the twyers by way of the piping 130, the supply of steam and oil by the piping 120 and 122 is shut off.

Having described my invention what I desire to secure by Letters Patent and claim is:

1. In an apparatus the combination of a furnace, means to furnish superheated steam, air and gaseous fuel for the desulfurization of a charge of ore in said furnace, and means to disintegrate the gangue of said ore.

2. In an apparatus the combination of a furnace, means to furnish superheated steam, air and gaseous fuel for a charge of ore in said furnace to desulfurize the same, and a cooling tank connected with said furnace o disintegrate the gangue of said ore.

3. In an apparatus the combination of a furnace, means to furnish superheated steam, air and gaseous fuel for ore in said furnace to desulfurize the same, a cooling tank connected with said furnace, means connected up between the furnace and cooling tank to adjustably discharge the desulfurized ore from the furnace into said cooling tank.

4. In an apparatus the combination of a furnace, means to furnish superheated steam, air and oil fuel for ore in said furnace to desulfurize the same, adjustable chutes connected with the furnace to discharge the desulfurized ore therefrom, discharging drums below the chutes and a cooling tank below said chutes.

5. In an apparatus of the character described, the combination of a furnace, a charging hopper for said furnace, sliding gates in the said hopper to charge ore into the central portion of the furnace, a twyer connected with said furnace to furnish oil, steam and air therein to desulfurize the ore, an inclined stationary separating and discharging chute at the lower end of the furnace, an adjustable swinging chute coacting with the said stationary chute, a cooling tank below the furnace, a rotary discharging drum below chutes to automatically discharge the ore from the furnace into said tank, and means to carry the ore from the tank.

6. In an apparatus of the character described the combination of a furnace, a charging hopper for said furnace, means in the hopper to charge ore to the central portion of said furnace, a water jacketed twyer support for the furnace, water jacketed protecting bars in the twyer support, a twyer for the twyer support, inclined stationary separating and discharging chutes at the lower end of the furnace, adjustable swinging chutes coacting with said stationary chutes, a cooling tank below the furnace, rotary discharging drums below the chutes to discharge the heated ore from said furnace into said tank, and a conveyer to carry away the ore from said tank.

7. In an apparatus of the character described, the combination of an inclosed furnace, means to furnish superheated steam, air and gaseous fuel for ore in said furnace, means to discharge the ore that has been treated from the furnace, a spray tank connected with said furnace, and means to draw fumes from the furnace into said spray tank.

8. In an apparatus of the character described the combination of an inclosed furnace, means to furnish superheated steam, air and gaseous fuel for ore in said furnace, and means to discharge the ore that has been treated from the furnace, and means to draw fumes from the furnace and through the spray tank.

9. In an apparatus of the character described the combination of an inclosed furnace, means to furnish superheated steam, air and oil fuel for ore in said furnace, means to discharge the ore that has been treated from the furnace, a spray tank, fume piping connecting the latter with the furnace, a zinc box, fume piping connecting the spray tank and the zinc box and an exhauster and fume piping connecting the exhauster with the zinc box.

10. In an apparatus of the character described the combination of an inclosed furnace, a twyer connected with the furnace, a spray tank, fume piping connecting the latter with the furnace, a zinc box, fume piping connecting the latter with the spray tank, an exhauster, fume piping connecting the exhauster with the zinc box, means to drain the spray tank and the zinc box, an oil tank, fume piping connecting the oil tank with the discharge end of the exhauster, piping connecting the upper end of the oil tank with said twyer to supply fuel gas thereto, and piping connecting the lower end of the oil tank and twyer to supply oil to the latter.

11. In an apparatus of the character described the combination of an inclosed furnace, a twyer connected with the furnace, a spray tank, fume piping connecting the upper end of the furnace with the spray tank, a zinc box, fume piping connecting the upper end of the spray tank and the zinc box, an exhauster, fume piping connecting the exhauster with the zinc box, a sump tank connected with the discharge end of the exhauster, a box with iron shavings, fume piping connecting the latter box with the sump tank, fume piping extending from the said box, an oil tank connected to the latter piping, piping for fuel gas leading from the oil tank to the twyer and piping for oil connecting the oil tank and said twyer.

12. In an apparatus of the character described the combination of a furnace, a water jacketed twyer support for the furnace, a water jacketed protecting bar in said support and a twyer for the twyer support.

13. In an apparatus of the character described the combination of a furnace, a water jacketed twyer support for the furnace, water jacketed protecting bars in said support, a twyer for the support and a burner connected up with the twyer.

Signed at the borough of Manhattan in the county of New York and State of New York this 9th day of October A. D. 1909.

CHARLES ANDERSON CASE.

Witnesses:
SET DE BONNEVILLE,
MARTIN ZIMANSKY.